US009533829B2

United States Patent
Teuber et al.

(10) Patent No.: US 9,533,829 B2
(45) Date of Patent: Jan. 3, 2017

(54) CONVEYOR CHAIN, IN PARTICULAR A CAN CONVEYOR CHAIN

(71) Applicant: IWIS Antriebssysteme GmbH & Co. KG, Munich (DE)

(72) Inventors: Toralf Teuber, Neufahrn (DE); Florian Madlener, Munich (DE)

(73) Assignee: IWIS ANTRIEBSSYSTEME GMBH & CO. KG, Munich (DE)

( * ) Notice: Subject to any disclaimer, the term of this patent is extended or adjusted under 35 U.S.C. 154(b) by 0 days.

(21) Appl. No.: 14/736,078

(22) Filed: Jun. 10, 2015

(65) Prior Publication Data

US 2015/0360868 A1     Dec. 17, 2015

(30) Foreign Application Priority Data

Jun. 17, 2014   (DE) .................. 10 2014 008 925

(51) Int. Cl.
*B65G 17/42*  (2006.01)
*B65G 17/32*  (2006.01)
(Continued)

(52) U.S. Cl.
CPC .............. *B65G 17/32* (2013.01); *B65G 17/12* (2013.01); *B65G 17/42* (2013.01); *B65G 17/46* (2013.01);
(Continued)

(58) Field of Classification Search
CPC ........................... B65G 17/42; B65G 2207/38
See application file for complete search history.

(56) References Cited

U.S. PATENT DOCUMENTS

| 4,388,990 A | * | 6/1983 | Michalik | ............... | B65G 17/42 198/719 |
| 4,880,108 A | * | 11/1989 | Burk | ..................... | B65G 17/42 198/487.1 |

(Continued)

FOREIGN PATENT DOCUMENTS

| DE | 93 14 261 U1 | 11/1993 |
| DE | 29810149 U1 | 9/1998 |

(Continued)

OTHER PUBLICATIONS

Search Report in Great Britain Application No. 1510179.3, dated Nov. 20, 2015.

*Primary Examiner* — Thomas Randazzo
(74) *Attorney, Agent, or Firm* — Baker and Hostetler LLP

(57) ABSTRACT

A conveyor chain, in particular a can conveyor chain, comprises chain links, which are interconnected by a respective chain hinge, and laterally projecting transport bars, which have a damping head made of a plastic material and provided for contact with the articles to be conveyed, the damping head comprising a fastening portion, a spring section arranged on said fastening portion and a contact portion connected to the spring section and adapted to contact the articles to be conveyed. A conveyor chain is provided of this type with a simpler and less failure-prone structural design. To this end, the damping head is provided with a front-side cavity of such a nature that the spring section has an elastically deformable wall portion whose wall thickness narrows, at least sectionwise, towards the contact portion, at least said spring section being made of an elastomer having a maximum shore hardness of A90.

16 Claims, 5 Drawing Sheets

(51) Int. Cl.
*B65G 17/12* (2006.01)
*B65G 17/46* (2006.01)

(52) U.S. Cl.
CPC ... *B65G 2201/0252* (2013.01); *B65G 2207/38* (2013.01)

(56) References Cited

U.S. PATENT DOCUMENTS

| | | | | |
|---|---|---|---|---|
| 4,930,620 | A * | 6/1990 | Springman | B65G 17/32 198/803.12 |
| 5,232,083 | A * | 8/1993 | Motominami | B65G 17/42 198/719 |
| 5,511,486 | A | 4/1996 | Pollard et al. | |
| 7,008,215 | B2 * | 3/2006 | Goss | B29C 49/4205 198/617 |
| 7,077,258 | B2 * | 7/2006 | Varone | B65G 47/90 198/379 |
| 7,549,530 | B2 * | 6/2009 | Souri | B65G 17/32 198/487.1 |
| 2006/0038313 | A1 * | 2/2006 | Sakaguchi | B65G 17/44 264/161 |

FOREIGN PATENT DOCUMENTS

| | | |
|---|---|---|
| DE | 199 45 912 A1 | 4/2001 |
| WO | 99/23018 A1 | 5/1999 |
| WO | 99/47438 A1 | 9/1999 |

\* cited by examiner

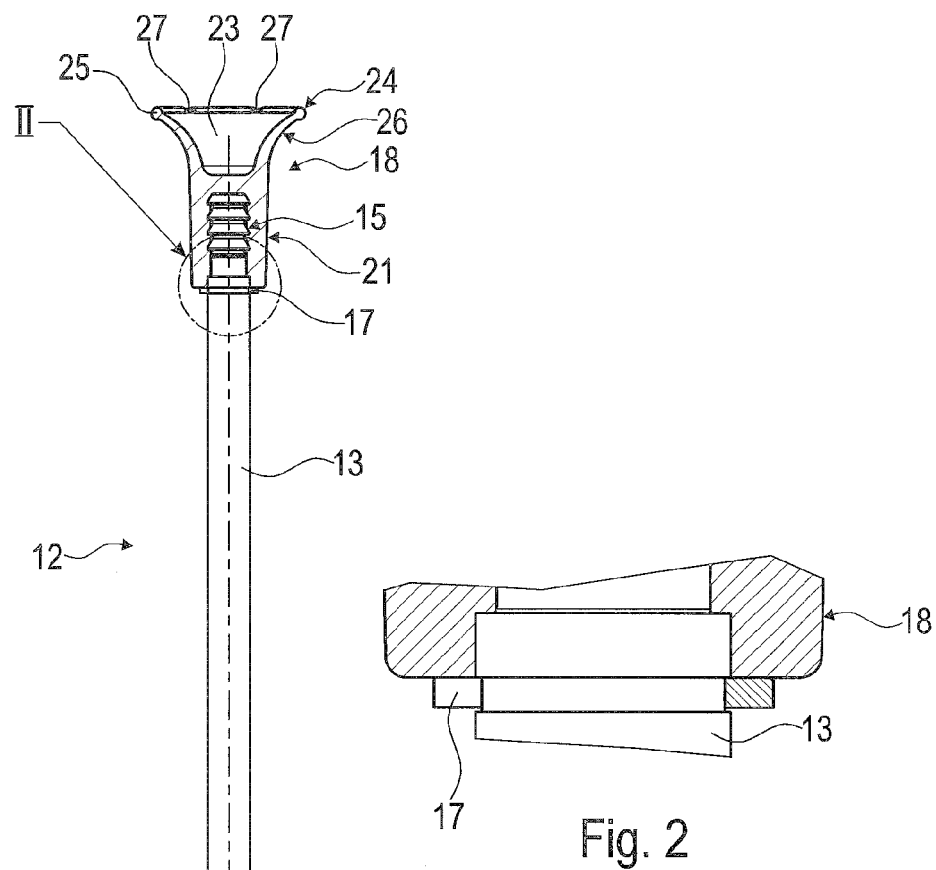
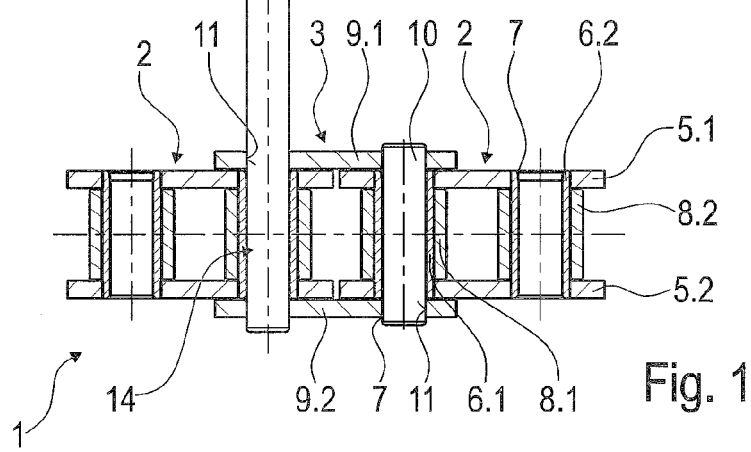
Fig. 2
Fig. 1

CONVEYOR CHAIN, IN PARTICULAR A CAN CONVEYOR CHAIN

CROSS-REFERENCE TO RELATED APPLICATION

This application claims priority to foreign German patent application No. DE 102014008925.8, filed on Jun. 17, 2014, the disclosure of which is incorporated by reference in its entirety.

FIELD OF THE INVENTION

The present invention relates to a conveyor chain, in particular a can conveyor chain, comprising chain links, which are interconnected by means of a respective chain hinge, and laterally projecting transport bars, which have a damping head made of a plastic material and provided for contact with the articles to be conveyed, said damping head comprising a fastening portion, a spring section arranged on said fastening portion and a contact portion connected to the spring section and adapted to contact the articles to be conveyed.

BACKGROUND

A conveyor chain of this type is known from DE 199 45 912 A1. The damping head is, at a lower portion thereof, fixedly connected to the upper end portion of a metal shaft of the transport bar and includes a central, elastic portion. This central, elastic portion is configured as a closed bellows, a spring steel strip structure or an elastic cushion. The impact part of the head may then again consist of a plastic solid material, which may be the same material as that of the fastening portion. DE 199 45 912 A1 is a concept application for improving known can conveyor chains of the type described e.g. also in WO 99/23018 A1. These known, widely-used can chains have damping heads, which are arranged such that they are displaceable relative to the shaft of the transport bar and which, for this purpose, are supported on a compression spring and secured in position by means of a locking washer. The external spring means used there may cause problems under the rough operating conditions of these conveyor chains, since a contamination of the mechanical spring system may result in a loss of the damping characteristics. Such conveyor chains are used e.g. in plants where cans are printed on and are sometimes subject to contamination through paints. The concepts presented in DE 199 45 912 A1 have, however, never been realized. Alternatively to the more failure-prone, spring-mounted damping heads, damping heads are also known, which are fixedly attached to the shaft of the transport bar and which are made of different plastic materials, said damping heads being, however, normally not capable of providing damping characteristics which are as good as those of the spring-mounted version. Another problem entailed by such conveyor chains for conveying cans is that entry in a drying oven after the painting process is normally accompanied by high temperatures and necessitates a certain thermal stability of the materials used, and that a side effect of this is usually a deterioration of the damping characteristics. Additional can conveyor chains are known from US2006/0038313A1 and U.S. Pat. No. 7,549,530 B2.

SUMMARY OF THE INVENTION

Hence, it is the object of the present invention to provide a conveyor chain of the above specified type, which has good damping characteristics and which is less failure prone.

In the case of a conveyor chain of the above specified type, the present invention achieves this object in that the damping head is provided with a front-side cavity of such a nature that the spring section has an elastically deformable wall portion whose wall thickness narrows, at least sectionwise, towards the contact portion, at least said spring section being made of an elastomer having a maximum shore hardness of A90. It follows that, according to the present invention, the spring section is configured on the basis of the shape of the damping head making use of a structural design that is open at the front. Due to the narrowing wall thickness, good elastic characteristics can be accomplished. Depending on the length of the spring section as well as the extent to which the wall thickness narrows, these spring characteristics can be adjusted and selected very effectively. This structural design will normally also lead to an annular contact between the damping head and the articles to be conveyed. This construction is also advantageous insofar as it leads to an optimized cross-sectional profile, especially in the transition region between the fastening portion and the spring section. This is the point which has applied thereto the highest loads, when a can strikes against the damping head. This accounted for by the increase in the wall thickness of the spring section in the direction of the fastening portion. Hence, the present structural design is very robust and provides nevertheless good damping characteristics. Up to now, cost-intensive high-temperature plastics (e.g. PEEK) have often been used for the damping heads of such conveyor chains. Thanks to the shape of the damping head it is now possible that at least the spring section may consist of an elastomer. The cans are often shot onto the transport bars by means of compressed air, a circumstance which has hitherto entailed high noise emission. Due to the use of the elastomeric material, at least in the spring section, also the acoustic load can be reduced to a very high extent. The hitherto used hard plastics and the inertia of the spring systems resulted in a correspondingly audible impact noise. The shore hardness is a material parameter for elastomeric plastics and is specified in the DIN EN ISO 868 and DIN ISO 7619-1 standards. In the present case, the determination is carried out according to shore hardness A at 23° C. Preferably, the elastomer has a minimum shore hardness of A50. According to a preferred embodiment, the cavity may have the shape of a truncated cone or of a bowl. In the case of many embodiments this results inevitably in a narrowing of the wall thickness in the specified direction. However, the cavity need not be used for connecting a shaft of the transport bar to the damping head. On the contrary, the damping head may fully cover the upper end of the shaft. The shape of the cavity and the axial dimensions thereof already suffice to accomplish different spring characteristics of the spring section.

In order to achieve the largest possible contact surface for the articles to be conveyed, in particular the cans, the outer circumference of the spring section may increase in size, at least sectionwise, in the direction of the contact portion according to one embodiment. The fastening portion may, however, have a comparatively small outer circumference, which, providing a suitable wall thickness, is adaptable to the outer circumference of a shaft that may here be associated therewith.

According to another embodiment, the lateral surface of the cavity may be convex and/or the outer surface of the spring section may be concave in an advantageous manner. Depending on the respective structural design, this will allow the damping head to widen more rapidly with respect to the axial direction, or an optimized reduction of the wall thickness of the spring section can be achieved. If both the lateral surface of the cavity and the outer surface of the spring section exhibit this kind or curvatures, different damping characteristics can be achieved on the basis of different radii of curvature and/or centers of curvature. In relation to the axial length, the elastic wall portion provided in the case of a curved wall of the spring section is longer than that provided in the case of a straight shape (e.g. a frusto-conical shape).

In order to still provide a sufficiently large contact surface on the contact area, in spite of the narrowing wall thickness of the spring section, said contact surface may be formed by an annular bead, which is arranged on the outer end of the spring section. The contact area is thus rendered more stable, since it is the first part that comes into contact with the articles to be conveyed and it is the part that has to transmit the contact forces.

In order to provide the damping effect of the damping head through the shape and possibly the material of the damping head alone, at least one air vent may be provided, which communicates with the cavity. If no such air vent were provided, the cavity may be sealed through the contact between the contact area and the articles to be conveyed, whereby the then trapped air would participate in the damping process. In order to prevent or influence this, the at least one air vent is provided. The damping head may also adhere to the articles to be conveyed, if no such air vent were provided.

According to another embodiment, the annular bead and/or the spring section may have an opening so as to form the at least one air vent. Depending on the design of the opening, said opening may influence not only venting but it may also directly influence the spring behavior of the damping head. Hence, the term "annular" also comprises an interrupted contact area or bead, whose separated regions jointly extend circumferentially around a common center. Also very soft damping characteristics can be achieved in this way.

According to a particularly simple version of the damping head, said damping head is produced as an integral component. Hence, the individual areas may preferably be connected to one another by a substance to substance bond. Although it will be advantageous to produce the damping head of the same material in a uniform manner, it is also possible to connect different materials by a substance to substance bond (e.g. through co-injection molding).

According to a preferred embodiment, a temperature-resistant elastomer, preferably FKM, can be used at least for the spring section. FKM is less expensive than PEEK and exhibits e.g. a permanent temperature resistance up to 250° and a short-term temperature resistance up to 320° C. FKM has a shore hardness in the range of from A60 to A70.

According to one embodiment, the transport bar has a shaft connected to the damping head, and, on the side facing away from the spring section, the fastening portion is provided with a blind hole opening having inserted therein the fastening area of the shaft.

To this end, the fastening area of the shaft may have on its surface a press-in profile, in particular a sawtooth profile, and may be press fitted into the blind hole opening of the damping head. Due to the elastic properties of the material used, intimate interlocking with the damping head is achieved in combination with reliable fastening.

In addition, a retaining ring may be provided as a stop for the damping head at the lower end of the fastening area. This will guarantee that the shaft is not pushed excessively deep into the damping head, where it may cause damage. The retaining ring determines the end of the push-in process. The retaining ring may be arranged in an annular groove or it may be pressed-on. Alternatively, also a defined deformation in the area of the shaft may carried out.

According to a preferred embodiment, the conveyor chain comprises alternating outer and inner chain links, said outer chain links comprising outer link plates and chain pins and said inner chain links comprising inner link plates and bushes, and transport bars are integrated at predetermined intervals. The transport bar may here also fulfil the function of the chain pin and is therefore part of the outer chain link. It is, however, also possible to use the transport bar in a plug-in variant or in a screwed variant. The inner chain links may be configured with or without rollers (bush-type chain and roller chain).

BRIEF DESCRIPTION OF THE DRAWINGS

In the following, an embodiment of the present invention will be explained in more detail making reference to a drawing, in which:

FIG. 1 shows a piece of a conveyor chain according to the present invention in a full section view, FIG. 2 shows the detail II of FIG. 1 in an enlarged representation.

DETAILED DESCRIPTION

Figure 3:
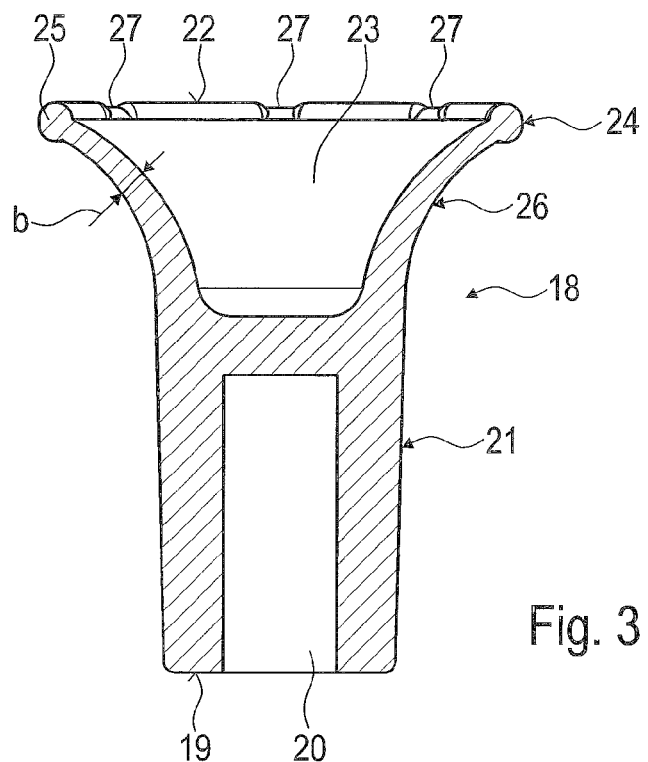
FIG. 3 shows the damping head according to FIG. 1 in an enlarged full section view.

The conveyor chain 1 shown sectionwise in FIG. 1 is a can conveyor chain, which serves especially for conveying cans, in particular beverage cans, and which conveys the cans e.g. through a drying oven. In the course of this process, the conveyor chain is subject to elevated temperatures as well as paints and the resultant contamination. The highly delicate articles to be conveyed must not be damaged, and the damping characteristics of the conveyor chain 1 are therefore extremely important.

The conveyor chain 1 comprises alternating inner chain links 2 and outer chain links 3, which are connected to one another by means of a respective chain hinge 4. The inner chain link 2 comprises two spaced apart inner link plates 5.1 and 5.2, which are connected to one another by means of bushes 6.1 and 6.2 that also arranged in spaced relationship with one another. To this end, the inner link plates 5.1 and 5.2 are provided with suitable openings 7.1 and 7.2 having press-fitted therein the end portions of the bushes 6.1 and 6.2. A respective roller 8.1 and 8.2 is rotatably supported on the outer circumferential surface of each bush 6.1 and 6.2. The outer chain link 3 comprises two spaced apart outer link plates 9.1 and 9.2 and, in most cases, two spaced-part chain pins 10. A respective chain pin 10 of the outer chain link 3 extends through an associated bush 6.1 or 6.2 of the inner chain link 2, so that they jointly define a respective chain hinge 4. At regular intervals, a chain pin 10 (as shown in FIG. 1) of an outer chain link 3 is replaced by a shaft 13 of a transport bar 12. The distance at which the transport bars 12 are spaced apart within a conveyor chain 1 depends on the articles to be conveyed. In the case of one embodiment provided (not shown), each seventh chain pin 10 is replaced by a shaft 13, i.e. most of the outer chain links 3 comprise two chain pins 10. The inner chain links 2 and the outer chain links 3 as well as the shaft 13 are made of a steel material. The mounting end 14 of the transport bar 12 is, like a chain pin 10, press fitted into the associated openings 11 of the outer link plates 9.1 and 9.2. Other fastening modes of the transport bar 12 are possible. The fastening area 15 of the shaft 13 has a sawtooth-shaped insertion structure in the form of circumferentially extending grooves. The lower end of the fastening area 15 is delimited by an annular groove 16 in the shaft 13. This annular groove 16 has arranged therein a retaining ring 17 (according to DIN 471).

The fastening area 15 of the shaft 13 has attached thereto a damping head 18 of the transport bar 12. As can especially be seen from FIG. 3, the damping head 18 has, on the lower side 19 thereof, a cylindrical blind hole opening 20. The blind hole opening 20 extends in the cylindrical fastening portion 21 of the damping head 18. The cross-section of the fastening portion 21 is annular in shape in the area of the blind hole opening 20 and circular in shape above the blind hole opening 20. The contact side 22 of the damping head 18 is provided with a cavity 23 which narrows in the direction of the fastening portion 21. A contact portion 24 of the damping head 18 is defined by an annular bead 25, which is substantially circular in cross-section. A spring section 26 extends between the fastening portion 21 and the contact portion 24. The spring section 26 thus enlarges in a funnel shape, starting from the fastening portion 21, towards the contact portion 24. The outer surface of the spring section 26 is concave, whereas the inner surface of the spring section 26 is convex, said inner surface being defined by the blind hole opening 20. The centers of the radii of curvature are not congruent. Nor are the curvatures used identical. This has the effect that a spring section 26 is defined, whose wall thickness b decreases from the fastening portion 21 towards the contact portion 24. Leaving out of account the transition radius at the bottom of the cavity 23, the wall thickness b decreases by approx. 50% (preferred range for the present invention 25 to 75%). Starting from the fastening portion 21, the damping head 18 widens (increases in diameter) up to the contact portion 24 by approx. 100% (preferred range for the present invention 50 to 150%). In comparison with a conical structural design with non-curved surfaces of the spring section 26, the wall of the spring section 26 is of greater length due to the curvature, said greater length finding expression in the spring properties.

In order to prevent the bead 25 from adhering to the articles to be conveyed, said bead 25 is provided with a plurality of spaced-apart air vents 27 in the form of grooves.

The damping head 18 is made of an elastomeric material. In the present example, a fluororubber (FKM) is used, which has an excellent resistance to oil and chemicals in a temperature range of from approx. −20° C. to +250° C. This fluororubber has a shore hardness in the range of from A60 to A70 (and lies therefore in the range of from min. A50 to max. A90). Depending on the intended use, other elastomeric materials may, however, be used as well. A choice is shown in the following Table 1:

TABLE 1

| 1) material | 2) code d. | 3) oil | 4) gasol. | 5) sulf. acid | 6) wat. | 7) ozone | properties |
|---|---|---|---|---|---|---|---|
| acrylate rubber | ACM | 1 | 2 | — | 3 | 2 | good ageing and ozone resistance ≈−25 to +130° C. |
| ethylene acrylic rubber | AEM | 1 | 2 | — | 3 | 2 | good resistance to weather and ozone ≈−40 to +150° C. |
| polyurethane rubber | PUR | 2 | 1 | 3 | 3 | 1 | good ageing and ozone resistance high resistance to tearing & wear ≈−30 to +80° C. |
| brombutyl rubber | BIIR | 3 | 3 | 2 | 1 | 3 | good resistance to acids & hot water ≈−40 to +150° C. |
| chlorobutyl rubber | CIIR | 3 | 3 | 2 | 1 | 3 | good resistance to acids & hot water ≈−40 to +150° C. |
| epichlorohydrin polymer | CO | 1 | 2 | — | 1 | 1 | low gas permeability, good resistance to weather & ozone ≈−40 to +140° C. |
| chlorobutadiene rubber | CR | 3 | 2 | 3 | 2 | 3 | good mechanical properties, resistant to weather and ozone ≈−45 to +100° C. |
| chlorosulfonated polyethylene | CSM | 3 | 3 | 2 | 1 | 1 | good resistance to chemicals, ageing & ozone, inflammable, ≈−20 to +120° C. |
| epichlorohydrin ethyleneoxide rubber | ECO | 1 | 2 | — | 1 | 1 | good resistance to mineral oils & fats, propane ≈−40 to +140° C. |

TABLE 1-continued

| 1) material | 2) code d. | 3) oil | 4) gasol. | 5) sulf. acid | 6) wat. | 7) ozone | properties |
|---|---|---|---|---|---|---|---|
| ethylene propylenediene rubber | EPDM EPM | 3 | 3 | 1 | 1 | 1 | good resistance to ageing, ozone and weather, very versatile, ≈−50 to +150° C. |
| perfluorinated rubber | FFPM FFKM | 1 | 1 | 1 | 1 | 1 | excellent media resistance for safety-related systems ≈−15 to +250° C. |
| fluororubber | FPM FKM | 1 | 1 | 1 | 1 | 1 | excellent resistance to oil and chemicals ≈−20 to +250° C. |
| fluoromethyl polysiloxane | FVMQQ, MQ MVQ | 1 2 2 | 1 3 3 | — 3 3 | — 1 2 | 1 1 1 | high thermal resis., high resis. to ageing, ozone, weather, electrically insulating ≈−80 to +175° C. ≈−60 to +180° C. ≈−60 to +200° C. |
| butyl rubber | IIR | 3 | 3 | 1 | 1 | 3 | good resis. to acids, hot water, glycol ≈−40 to +150° C. |
| acryl nitrile butadiene rubber | NBR | 1 | 2 | 3 | 1 | 3 | versatile use, poor resistance to ozone and weather, ≈−30 to +100° C. |
| natural rubber | NR | 3 | 3 | 3 | 2 | 3 | good mechanical strength and elasticity, inflammable ≈−60 to +80° C. |
| styrene butadiene rubber | SBR | 3 | 3 | 2 | 2 | 3 | improved resistance to abrasion and ageing ≈−50 to +100° C. |

1) material - raw material group
2) code designation DIN 7728
resistances
3) to mineral oil
4) to gasoline
5) to sulfuric acid (conc.)
6) to water
7) to ozone In the following, the mode of operation of the present invention will be explained briefly on the basis of the above embodiment.

The conveyor chain 1, only a small detail of which is shown in FIG. 1, may have a considerable length and is provided for conveying cans through a drying oven. The cans are transferred to transport bars 12, where they strike with their bottom and their inner circumferential surface more or less sharply against the damping head 18. The delicate cans must not be damaged during this process, and that is why the damping head 18 must provide a suitable damping effect, which must not fail in spite of the conditions prevailing in the production process, e.g. the presence of paints, contaminations and temperature influences. Due to the shape of the damping head 18 and its rigid, i.e. fixed arrangement on the fastening area 15 of the shaft 13, the damping head 18 has imparted thereto excellent damping characteristics on the basis of geometric parameters and the properties of the material used. Hence, no additional components or moving parts are necessary. The conveyor chain 1 can thus be produced with less mounting effort. Also the exchange of damping heads 18 is very easy. Due to the elasticity of the material used, an intimate connection of the shaft 13 can be accomplished by means of the sawtooth profile at the fastening end 15. Furthermore, the lower side 19 of the damping head 18 is additionally supported by the retaining ring 17, so that the fastening end 15 will be prevented from axially penetrating the material of the damping head 18. Due to the fact that the damping head 18 is fixedly secured to the shaft 13 (no relative movement and, consequently, neither friction losses nor any risk of jamming or canting), there is no risk that the spring effect may fail. The use of an elastomeric material, in particular of the elastomer FKM, provides a cost-efficient alternative to plastic materials, in particular PEEK, which have hitherto been employed for such cases of use. Due to the fact that gaps are avoided in the case of the new solution, new fields of use are opened up also in the sphere of packages for cosmetics, medicines and food. Contaminations, germs and bacteria cannot deposit in gaps.

Figure 4A:
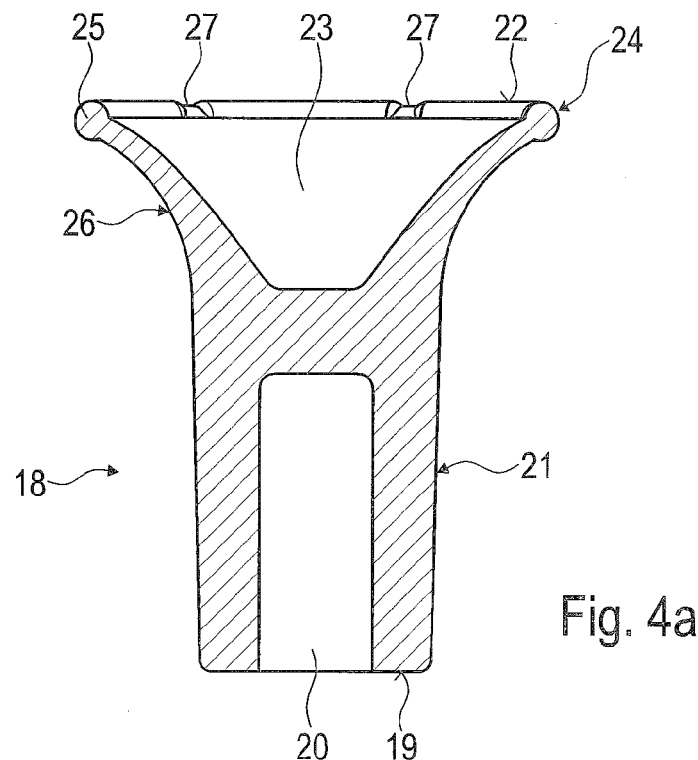
FIG. 4A-4C show various embodiments of a damping head in a full section view.
Figure 4B:
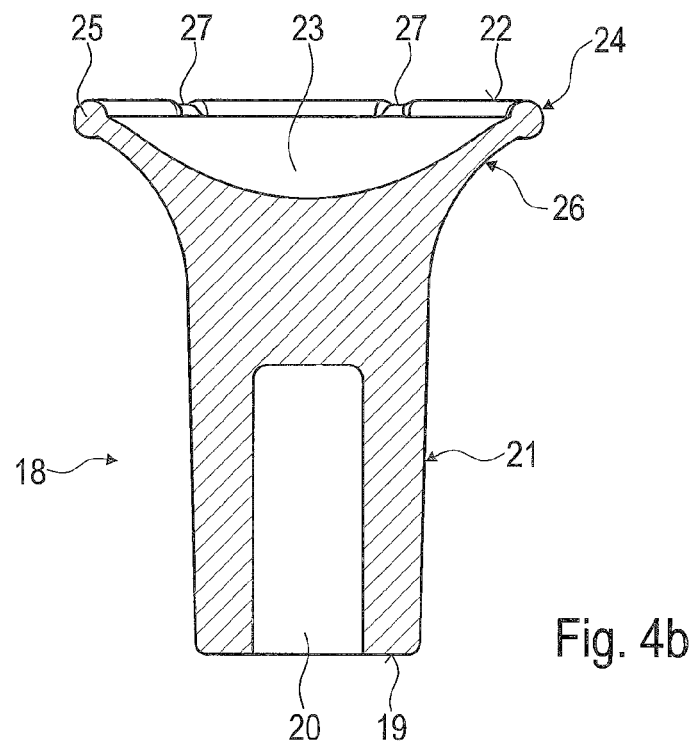
Figure 4C:
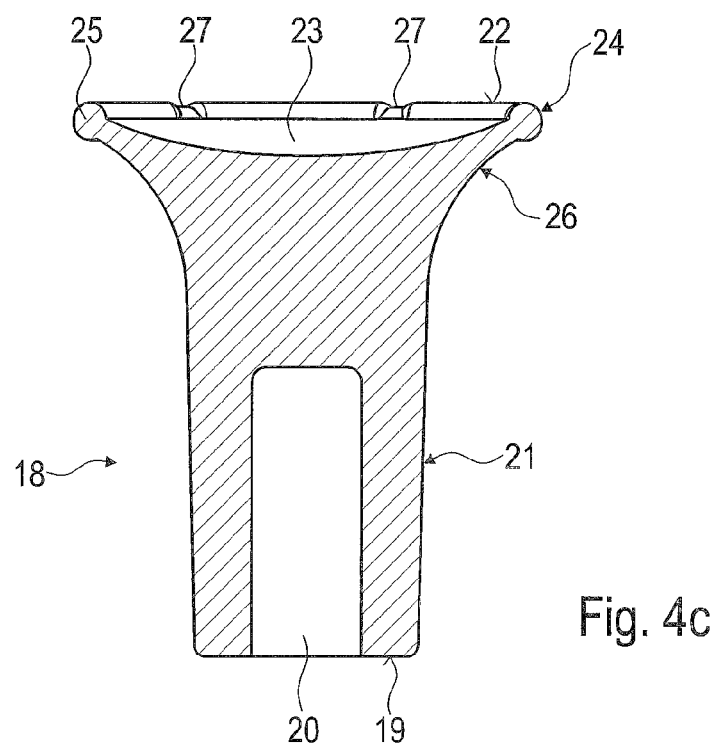

Making reference to FIG. 4A to 4C, alternative embodiments of the damping head 18 will be explained in more detail. A decrease in the damping characteristics, i.e. a harder damping, can be seen in a particularly clear manner from the sequence of FIG. 4A to 4C. This is accomplished by respective cavities 23 of different depths in the contact side 22.

Figure 5:
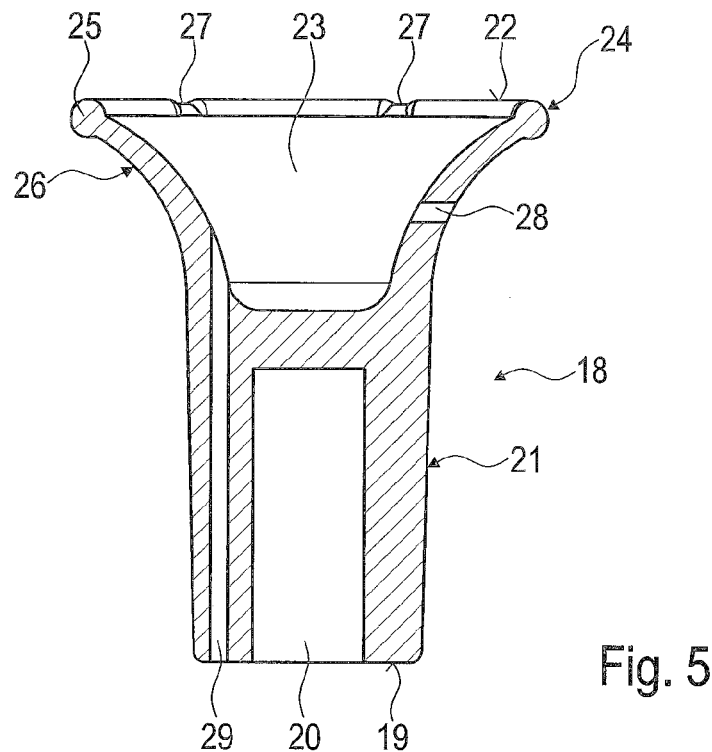
FIG. 5 shows a further embodiment of a damping head with various venting variants in a full section view.

Making reference to FIG. 5, different possibilities of venting the cavity 23 are shown. In addition to groove-shaped air vents 27 in the bead 25, there may also be provided one or a plurality of radial air vents 28 in the wall of the spring section 26, or one or a plurality of air vents 29 extending through the fastening portion 21 and the spring section 26 in an axially parallel manner. These alternatives may be used independently or in any combination.

Figure 6:
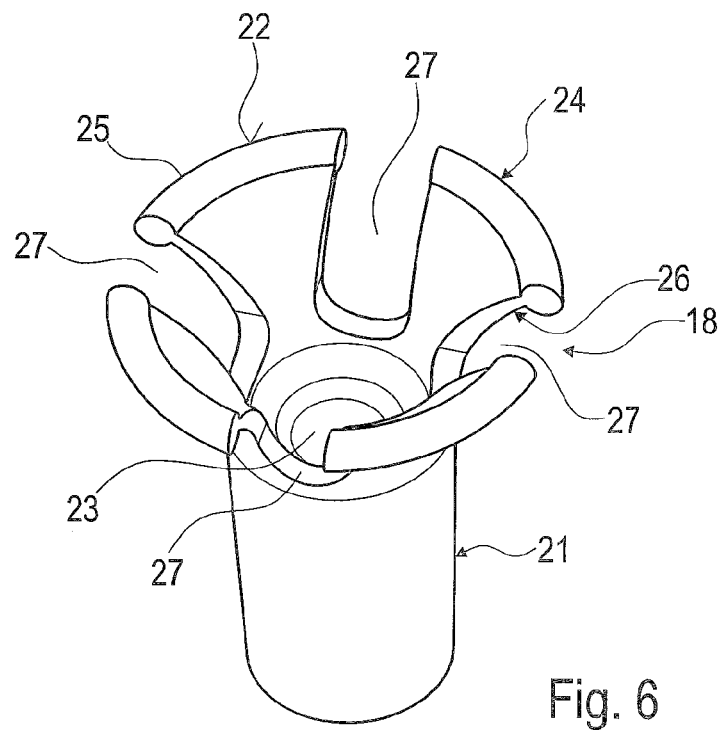
FIG. 6 shows a further embodiment of a damping head in an enlarged perspective view obliquely from the front.

On the basis of FIG. 6, a further embodiment of the damping head 18 is shown. For defining the air vent 27, openings are distributed along the circumference, which penetrate through the bead 25 and extend into the spring section 26 to a considerable extent. Lobe-shaped areas of the spring section 26 are thus formed, which lead to substantially softer damping characteristics. The width, the depth and the orientation (straight or oblique or curved formation) of the openings will here influence the damping behavior to decisive extent. Due to the unchanging width of the opening shown, the lobe-shaped areas of the spring section narrow in width towards the bottom, whereas they increase in thickness by definition. The embodiments according to the figures should only be considered as design possibilities, which may also be combined with one another, so as to achieve different damping characteristics without any relative movement between the damping head 18 and the shaft 13 being necessary.

Figure 7:
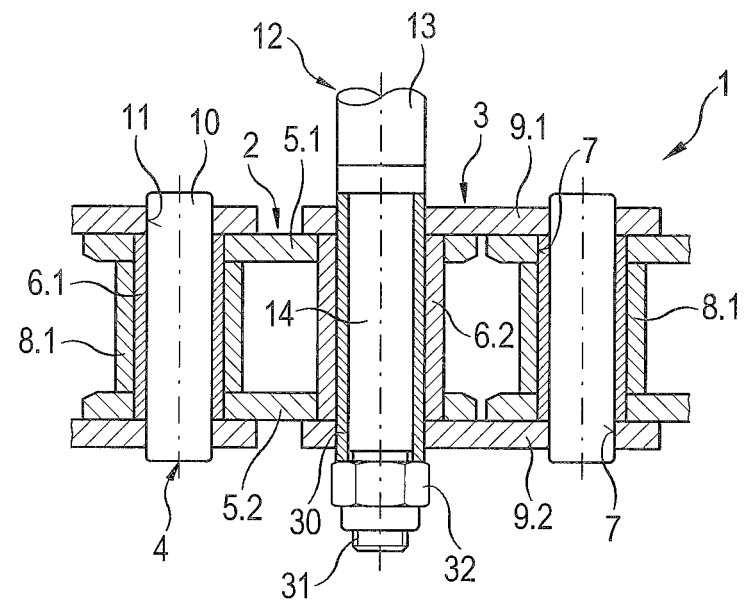
FIG. 7 shows a connection variant of the transport bar in an enlarged full section view.

In the following, a variant of attaching the transport bar will be shown making reference to FIG. 7. The present variant is a so-called screwed variant. To this end, a chain hinge 4 is given a different structural design. The use of a roller is dispensed with and, instead, an enlarged bush 6.2 is installed in the inner chain link 2. A longer bush 30 extends through said bush 6.2, said longer bush 30 being press fitted into the outer link plates 9.1, 9.2. This longer bush 30 has inserted therein the mounting end 14 of the transport bar 12. This mounting end 14 has a threaded portion 31, which is secured in position by a locking nut 32 supported on the end face of the long bush 30.

Figure 8:
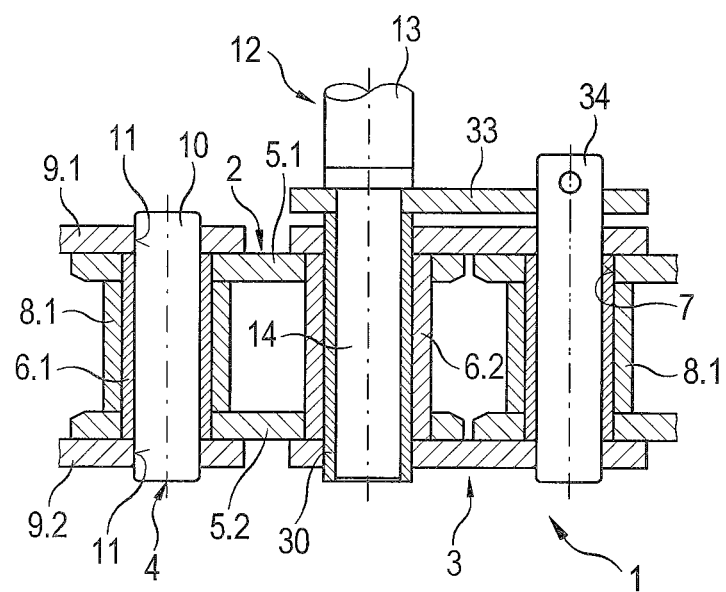
FIG. 8 shows another connection variant of the transport bar in an enlarged full section view.

Making reference to FIG. 8, a further variant is now described, which is referred to as plug-in variant. To this end, a roller 8.2 of the inner chain link 2 is again omitted and replaced by an enlarged bush 6.2, which is press fitted to the inner link plates 5.1, 5.2. This longer bush has inserted therein the mounting end 14 of the transport bar 12. The mounting end is additionally provided with a locking tongue 33 that extends parallel to the outer link plates 9.1, 9.2. The associated outer chain link 3 is provided with an elongated chain pin 34 extending into an opening of the locking tongue 33 and projecting therebeyond. Locking is in this case effected by means of a splint, which is not shown in detail.

LIST OF REFERENCE NUMERALS 1 conveyor chain
2 inner chain link
3 outer chain link
4 chain hinge
5.1, 5.2 inner link plate
6.1, 6.2 bush
7 opening
8.1, 8.2 roller
9.1, 9.2 outer link plate
10 chain pin
11 opening
12 transport bar
13 shaft
14 mounting end
15 fastening area
16 annular groove
17 retaining ring
18 damping head
19 lower side
20 blind hole opening
21 fastening portion
22 contact side
23 cavity
24 contact portion
25 bead
26 spring section
27 air vent
28 air vent
29 air vent
30 long bush
31 threaded portion
32 locking nut
33 locking tongue
34 elongated chain pin

The invention claimed is:

1. A conveyor chain comprising chain links, which are interconnected by means of a respective chain hinge, and laterally projecting transport bars, which have a damping head made of a plastic material and provided for contact with the articles to be conveyed, said damping head comprising a fastening portion, a spring section arranged on said fastening portion and a contact portion connected to the spring section and adapted to contact the articles to be conveyed,
   wherein the damping head is provided with a front-side cavity of such a nature that the spring section has an elastically deformable wall portion whose wall thickness decreases towards the contact portion, and that at least the spring section is made of an elastomer having a maximum shore hardness of A90, and
   wherein an outer circumference of the spring section increases in size in a direction towards the contact portion.

2. The conveyor chain according to claim 1, wherein the cavity has the shape of a truncated cone or of a bowl.

3. The conveyor chain according to claim 1, wherein a lateral surface of the cavity is convex and/or an outer surface of the spring section is concave.

4. The conveyor chain according to claim 1, wherein the spring section has an opening so as to form at least one air vent.

5. The conveyor chain according to claim 1, wherein the damping head is produced as an integral component.

6. The conveyor chain according to claim 1, wherein the damping head is made of a same material in a uniform manner.

7. The conveyor chain according to claim 1, wherein the damping head consists of FKM.

8. The conveyor chain according to claim 1, wherein, at a lower end of the fastening area, a retaining ring is provided as a stop for the damping head.

9. The conveyor chain according to claim 1, wherein alternating outer and inner chain links are provided, said outer chain links comprising outer link plates and chain pins and said inner chain links comprising inner link plates and bushes, and that transport bars are integrated at predetermined intervals.

10. The conveyor chain according to claim 1, wherein the transport bar has a shaft connected to the damping head, and that, on a side facing away from the spring section, the fastening portion is provided with a blind hole opening having inserted therein the fastening area of the shaft.

11. The conveyor chain according to claim 10, wherein the fastening area of the shaft has on its surface a press-in profile and is press fitted into the blind hole opening of the damping head.

12. The conveyor chain according to claim 11, wherein the press-in profile is a sawtooth profile.

13. A conveyor chain comprising chain links, which are interconnected by means of a respective chain hinge, and laterally projecting transport bars, which have a damping head made of a plastic material and provided for contact with the articles to be conveyed, said damping head comprising a fastening portion, a spring section arranged on said fastening portion and a contact portion connected to the spring section and adapted to contact the articles to be conveyed,
   wherein the damping head is provided with a front-side cavity of such a nature that the spring section has an elastically deformable wall portion whose wall thickness decreases towards the contact portion, and that at least the spring section is made of an elastomer having a maximum shore hardness of A90, and
   wherein the contact portion is defined by an annular bead, which is arranged on an outer end of the spring section.

14. The conveyor chain according to claim 13, wherein the annular bead has an opening so as to form at least one air vent.

15. A conveyor chain comprising chain links, which are interconnected by means of a respective chain hinge, and laterally projecting transport bars, which have a damping head made of a plastic material and provided for contact with the articles to be conveyed, said damping head comprising a fastening portion, a spring section arranged on said fastening portion and a contact portion connected to the spring section and adapted to contact the articles to be conveyed,
   wherein the damping head is provided with a front-side cavity of such a nature that the spring section has an elastically deformable wall portion whose wall thickness decreases towards the contact portion, and that at least the spring section is made of an elastomer having a maximum shore hardness of A90, and
   wherein the damping head has at least one air vent that communicates with the cavity.

16. The conveyor chain according to claim 15, wherein the annular bead has an opening so as to form the at least one air vent.

\* \* \* \* \*